Patented June 13, 1933

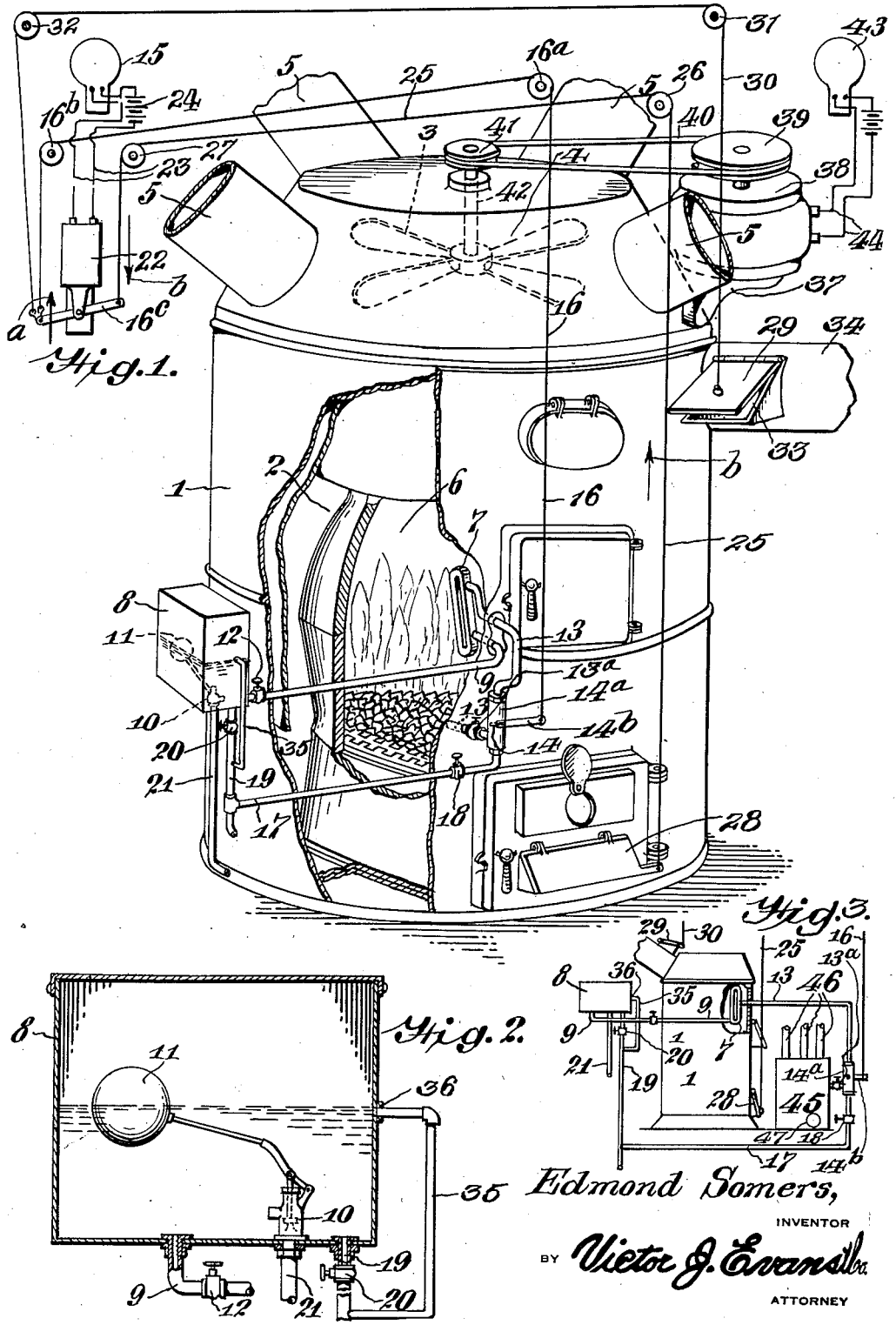

1,914,307

UNITED STATES PATENT OFFICE

EDMOND SOMERS, OF LINWOOD, NEW JERSEY

HUMIDIFIER FOR HOT AIR FURNACES OR HEATERS

Application filed May 13, 1932. Serial No. 611,207.

This invention relates to an improved humidifier especially adapted for use in connection with hot air furnaces or heaters, the purpose being to humidify the hot air, so that when it is delivered through various hot air ducts to various rooms, the hot air will contain the requisite moisture.

Another purpose is to provide, in a device of this kind automatic means for controlling the humidity in the hot air, the temperature of the air and moisture also being substantially uniform at all times.

Another purpose is to provide a humidifier wherein the humidity is supplied from a central point, and due to the moisture in the hot air dust is kept down to a minimum, and due to the uniform humidity, interior decorations and furniture, rugs, etc., are kept from becoming too dry, their brightness being retained.

Still another purpose is to provide a tank for the water, a float and ball valve for a supply pipe which enters the tank for maintaining the water in the tank at a uniform level, in combination with a water back or coil in the fire box, and in which the water level is kept uniform with that in the tank, the water back or coil adapted to contain substantially one pint, while the tank is adapted to contain two gallons.

A further purpose is to provide, in a humidifier for hot air furnaces means for delivering the steam from the water in the water back or coil into a hot air chamber of the furnace, and due to the furnace having a revoluble fan in its dome the moisture is thoroughly mixed with the hot air in the hot air chamber and delivered through the hot air ducts to the various rooms of a dwelling.

A still further purpose is to provide, in a device of this kind means whereby excess steam may be carried off to the waste.

It is to be understood that the particulars herein given are in no way limitative, and that while still keeping within the scope of the invention, any desired modification of the details and proportions may be made in the construction of the appliance according to circumstances.

The invention comprises further features and combination of parts to be hereinafter set forth, shown in the drawing and claimed.

In the drawing:—

Figure 1 is a view in perspective of an improved hot air furnace, showing the invention as applied and constructed in accordance with the invention.

Figure 2 is a sectional view through the tank showing the float and ball valve for a supply pipe.

Figure 3 is a diagram of the humidifier as applied to a hot water heater, instead of to a hot air furnace.

Referring to the drawing 1 identifies a hot air furnace of a type having a hot air chamber 2, and wherein the inside of the dome 4 is provided with a revoluble fan 3, for the purpose of thoroughly mixing the moisture and the hot air prior to leaving the various hot air ducts or conduits 5 to the rooms of a dwelling.

Located in the fire box 6 of the furnace is a water back or coil 7, which is connected to the bottom of a tank 8 by means of a pipe 9. This pipe 9 passes through the wall of the furnace in order to connect with the water back or coil.

On the interior of the tank or container 8 a conventional type of float controlled operating valve 10 is arranged, so that when the float 11 lowers the valve opens to allow inflow of the water. In this way a constant uniform level of water is maintained in the tank, which level corresponds with the level of the water in the water back or coil 7. The pipe 9 has a valve 12 for controlling the supply of water from the tank to the water back or coil.

A pipe 13 connects with the water back or coil at a point substantially above the level of the water in the water back. This pipe in turn passes through the outer shell of the furnace and enters the hot air chamber 2, thereby conducting the steam rising from the water in the coil 7 into the hot air chamber 2, thereby providing moisture for the hot air in the chamber.

A butterfly valve 14 is mounted in a casing 14a, and to which the pipe 13 is connected. The pipe 13 has a valve 13a for controlling the amount of steam into the hot air chamber 2. As a rule the valve 13a is fully open, though it may be at times only partially open. An arm 14b is carried by the stem of the butterfly valve 14, and connected to the arm is a chain, cable or the like 16, which after passing over pulleys 16a and 16b is in turn connected to a lever 16c of a conventional type of temperature regulator, preferably one known as the "Holland" make, said regulator being identified by the reference numeral 22. This "Holland" temperature regulator is operated by an electric circuit identified at 23 including a battery 24, the circuit being controlled by any conventional type of thermostat 15, which closes and opens the circuit in order to actuate the temperature regulator 22, causing the lever 16c to tilt, and actuate the chain or cable 16, for opening the butterfly valve 14. The opening of the butterfly valve 14 will permit steam to pass through the casing 14a and through that portion of the pipe 13 where it enters the shell of the furnace and the interior of the chamber 2. When the thermostat 15 operates to close the circuit passing through the leads 23 and the battery 24, the "Holland" temperature regulator in turn electrically operates, the lever 16c tilting in the direction of the arrow a, slacking upon the chains or cables 16 and 30, allowing the door 29 to close and permitting the arm 14b of the butterfly valve to tilt downwardly by gravity. In this case, the end of the lever 16c to which the chain or cable 25 (which passes over the pulleys 26 and 27) is connected, moves upwardly and the chain or cable is pulled in the direction of the arrows b, thereby opening the draft door 28. Also upon moving of the lever 16c in the direction of the arrow a, the damper door 29 (which is connected by a cable or chain 30 passing over pulleys 31 and 32) closes. This damper door controls an opening 33 of the smoke flue or pipe 34. The cables or chains 16 and 30 at the point where they connect to the lever 16c are capable of adjustment, so as to regulate the opening and closing of the butterfly valve 14 as well as the opening and closing of the door 29 of the smoke flue or pipe 34. The adjustment of the cables or chains 16 and 30 will also regulate the closing and opening of the draft door 28, which is accomplished by the chain or cable 25, upon movement of the lever 16c.

Through the medium of the thermostat 15 and its electrical connections with the temperature regulator 22, the butterfly valve can be automatically regulated, and hence automatically govern the amount of steam or moisture entering the hot air chamber. Obviously the loose mounting of the butterfly valve 14 enables the valve to close by gravity, when tension on cable 16 is released.

A pipe 17 connects to the casing of the butterfly valve 14, and located in the pipe 17 is a valve 18, and by partially opening the valve 18 in relatively mild weather a portion of the steam can be drained off through the pipe 17 and through the waste pipe 19. This waste pipe 19 connects to the bottom of the tank or container 8 and has a valve 20, and by opening the same the tank or container 8 can be drained and the sediment therein removed.

An overflow pipe 35 is connected to the waste pipe 19 at a point below the valve 20 and in turn connects to the side of the tank or container 8 as at 36, so that any overflow of the water in the tank or container may be carried off through the waste pipe 19.

A water supply pipe 21 connects to the bottom of the tank or container, and with the end of which on the interior of the tank the float controlled valve 10 cooperates for governing the supply of water to the tank.

Supported at 37 on the furnace is a conventional type of motor 38, the shaft of which carries a pulley 39 engaged by a belt 40, which in turn engages about a pulley 41 carried by the shaft 42 of the revoluble fan 3. A thermostatic switch 43 (which may be arranged at any suitable location) has electrical connections 44 including a battery, so that according to the temperature, the switch will close, and thereby close the circuit and in turn operate the motor 38, which in turn will transmit power to the revoluble fan 4, which will in turn churn the hot air and moisture or steam in the dome and discharge it through the several hot air ducts or flues 5.

Referring to Figure 3 it will be noted that the humidifier as shown is applied to a hot water heater. The steam in passing through the casing of the butterfly valve 14, will enter a container or tank, and through the medium of a fan (not shown) installed on the interior of this container or tank 45, and adapted to be operated as in Figure 1 the steam or moisture therein can be discharged through a plurality of pipes 46 to the various rooms of a dwelling. The container or tank 45 is provided with suitable air inlet means 47.

It is possible to supply some suitable disinfectant or a perfume solution on the bottom of the pan in the heat chamber 2, so that the fumes therefrom can be carried along with the steam to the dome and caused to be circulated through the several flues 5.

By reason of the fact of steam being generated in the water back or coil, and then conducted into the heat chamber 2, all germs or impurities that may be contained in the water are removed.

When the atmospheric humidity is higher than desired in the home the valve 13a can be closed and the valve 18 opened, and by setting the butterfly valve 14 all steam from the water back or coil can be by passed to the sewer through the waste pipes 17 and 19. In this positive method of by-passing all the steam to the sewer, the humidity is finally reduced to a point practically nil, in which case the steam or fog on windows can be entirely avoided.

Due to this heater or furnace being of an air circulating type, that is to say the heat and moisture being driven through the flues to the rooms, and brought back through the base of the heater and re-heated and since the steam is conducted from the water back or coil by pipe to the base of the heater, the re-heated air and the steam or moisture again mixes and passes through the dome and is re-circulated.

The invention having been set forth, what is claimed is:

1. In a humidifier for heaters, the combination with a hot air chamber provided in said heater, of a water back positioned within the fire box of the heater, a water supply tank having a pipe connecting with the water back, the water in the tank and the water back being of uniform level, a pipe connected to the water back above the level of the water therein and in turn entering the hot air chamber for conducting steam thereinto, an automatically controlled valve in the last named pipe for automatically controlling steam into said hot air chamber, a drain pipe connected to the bottom of the tank including a valve for controlling the drainage from the tank, an overflow pipe connected to the tank at a point adjacent the level of the water therein and in turn connected to the drain pipe below its valve, a pipe connected to the drain pipe and in turn to a casing of the automatically controlled valve for passing excessive steam off through the drain pipe, and a manually operated valve in the pipe which connects to said valve casing for controlling said excessive steam.

2. In a humidifier for heaters, a hot air chamber in said heater, a water back disposed in the fire box of the heater, a water supply tank provided with a drain pipe, a pipe connecting the tank and the water back to supply water to the back, the level of the water in the tank and the water back being uniform, a pipe connected to the water back above the water level and in turn to the drainpipe for passing off excessive steam, a controlling valve including a casing in said last named pipe, a pipe connecting said casing of the controlling valve and the hot air chamber for conducting steam into the latter, a manually operated valve in said pipe which enters the hot air chamber for manually controlling the steam to the hot air chamber, and a manually operated valve in the pipe which connects the water back and the drain pipe at a point below the controlling valve casing.

3. In a humidifier for heaters, a hot air chamber in said heater, a water back disposed in the fire box of the heater, a water supply tank provided with a drain pipe, a pipe connecting the tank and the water back to supply water to the back, the level of the water in the tank and the water back being uniform, a pipe connected to the water back above the water level and in turn to the drain pipe for passing off excessive steam, a controlling valve including a casing in said last named pipe, a pipe connecting said casing of the controlling valve and the hot air chamber for conducting steam into the latter, a manually operated valve in said pipe which enters the hot air chamber for manually controlling the steam to the hot air chamber, and a manually operated valve in the pipe which connects the water back and the drain pipe at a point below the controlling valve casing, a manually operated valve in the drain pipe for controlling the drainage, an overflow pipe connected to the tank incident to the water level and in turn to the drain pipe below its manually operated valve, a supply pipe connected to the bottom of the tank and including a float controlled valve on the interior of the tank.

4. In a humidifier for heaters, the combination with a hot air chamber within the heater, of a water back disposed in the fire box of the heater, a water tank including a source of supply and provided with a drain pipe including a manually operated valve for controlling the drainage through the pipe, a pipe connecting the tank and the water back to supply water to the latter, the level of the water in the tank and the water back being uniform, a pipe connected to the water back above the water level and in turn entering the hot air chamber for conducting steam thereinto and provided with a manually operated valve to control said steam, automatically operated means including a casing in said steam pipe for controlling the steam into the hot air chamber when the manually operated valve is open, a pipe connecting said casing and said drain pipe and provided with a valve to control excess steam through the drain pipe, and an overflow pipe connected to the tank incident to the water level and in turn connected to the drain pipe below its control valve.

5. The combination with a heater including a fire pot and a hot air chamber having a dome and heat conducting flues leading therefrom, of a water back in the fire pot in which steam is generated from the water therein, means for conducting the steam from the water back into the lower portion of the heat chamber thereby supplying moisture to the hot air therein, and an automatically driven fan in the dome of the heat chamber for lifting the moisture and the hot air and mixing the same and distributing it through the various heat conducting flues of the heater.

In testimony whereof I affix my signature.

EDMOND SOMERS.